United States Patent [19]

Schulte

[11] 4,219,694
[45] Aug. 26, 1980

[54] INSULATED MOUNTING FOR LIVE RAILS

[75] Inventor: Uwe Schulte, Wetter, Fed. Rep. of Germany

[73] Assignee: Demag A.G., Duisburg, Fed. Rep. of Germany

[21] Appl. No.: 959,017

[22] Filed: Nov. 9, 1978

[30] Foreign Application Priority Data

Nov. 12, 1977 [DE] Fed. Rep. of Germany ....... 2750675

[51] Int. Cl.² .................. H01B 17/18; B60M 5/00
[52] U.S. Cl. .................................. 174/156; 191/32; 248/68 CB
[58] Field of Search ............ 174/149 R, 149 B, 156, 174/157, 158 R, 163 R, 171; 191/22 R, 23 A, 32, 40; 238/159, 160, 161; 248/67.5, 68 CB

[56] References Cited

U.S. PATENT DOCUMENTS

| 1,623,920 | 4/1927 | Harris | 191/32 |
| 4,099,626 | 7/1978 | Magnussen, Jr. | 248/68 CB X |
| 4,114,241 | 9/1978 | Bisping | 248/68 CB X |

FOREIGN PATENT DOCUMENTS

| 2424987 | 12/1975 | Fed. Rep. of Germany | 191/22 R |
| 2453754 | 3/1976 | Fed. Rep. of Germany | . |
| 2458029 | 4/1976 | Fed. Rep. of Germany | . |
| 1314840 | 12/1962 | France | 191/32 |

*Primary Examiner*—Laramie E. Askin
*Attorney, Agent, or Firm*—Mandeville and Schweitzer

[57] ABSTRACT

A mounting structure is provided for mounting one or more live rails in a bank of such rails, the mounting structure providing simple means for including additional rails in the bank. The structure comprises a plurality of identical mounting halves, two of which cooperate to mount a single rail. When mounting a rail, the two cooperating halves present cooperating exposed surfaces for the joining of additional mounting halves and rails on each side thereof. Each mounting half includes identical cooperating recesses and projections which when joined together hold a rail in a mounted position. Each half also includes a gripping claw for grasping a single bracing panel or plank for holding an entire bank of mounted rails together.

12 Claims, 7 Drawing Figures

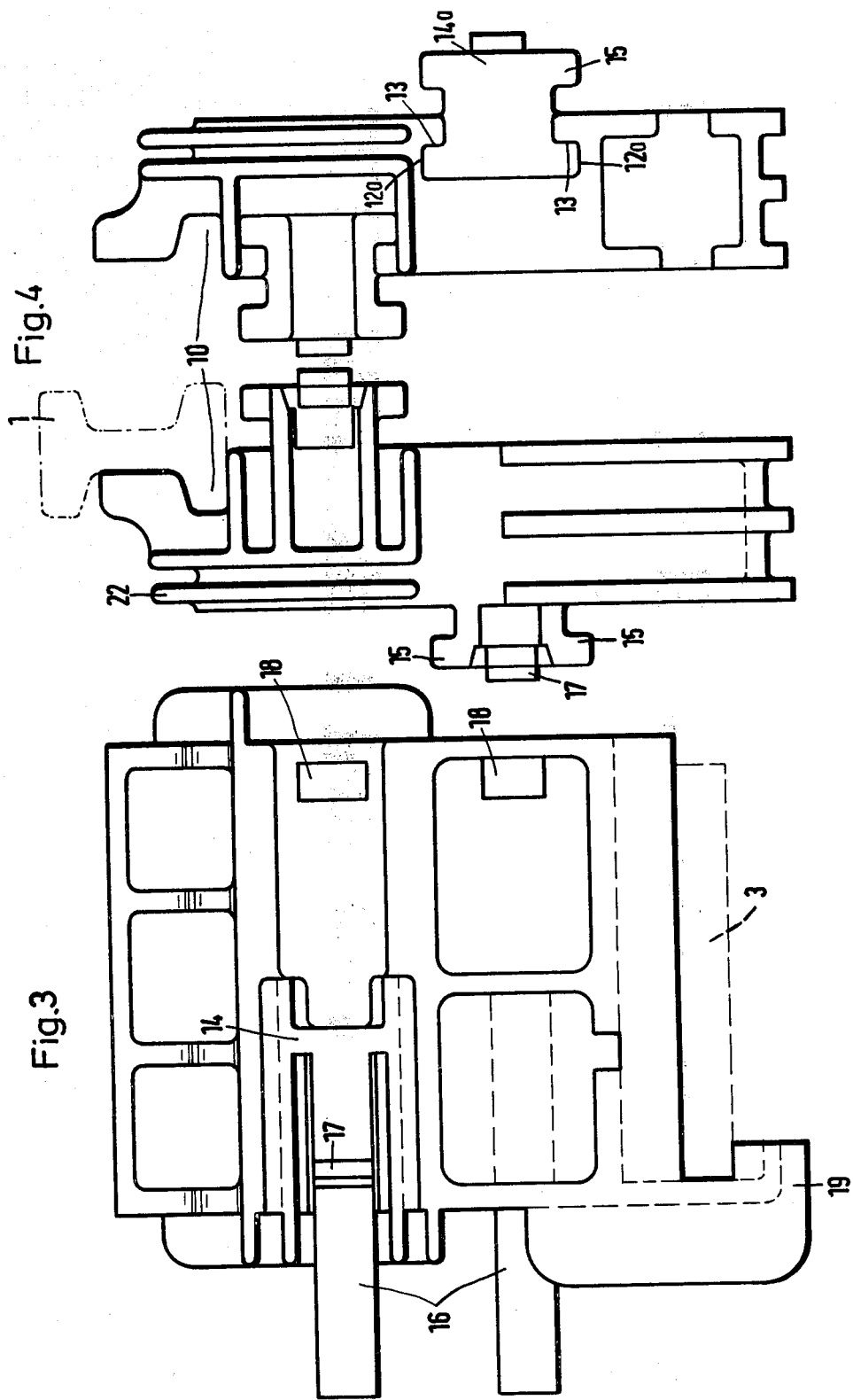

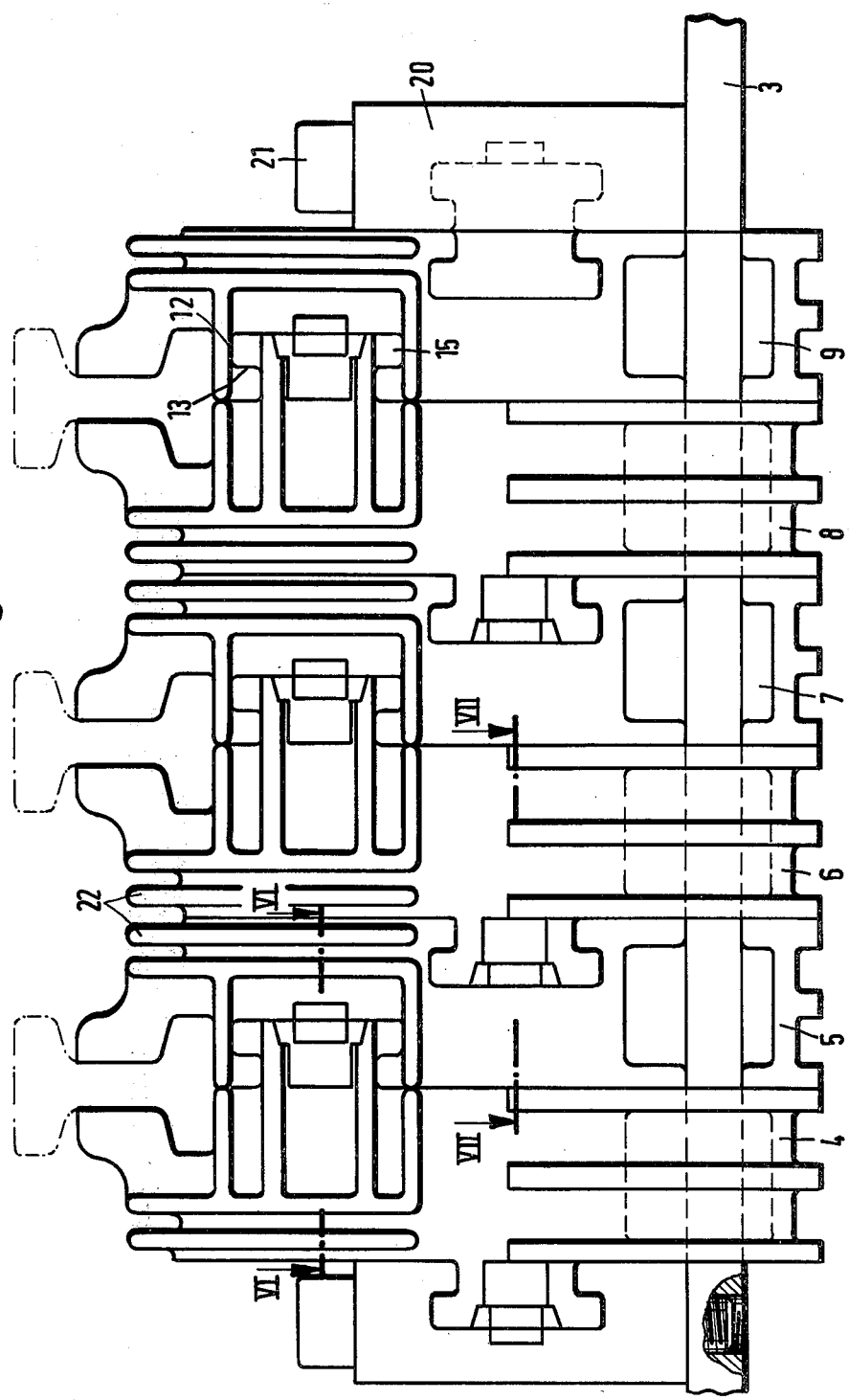

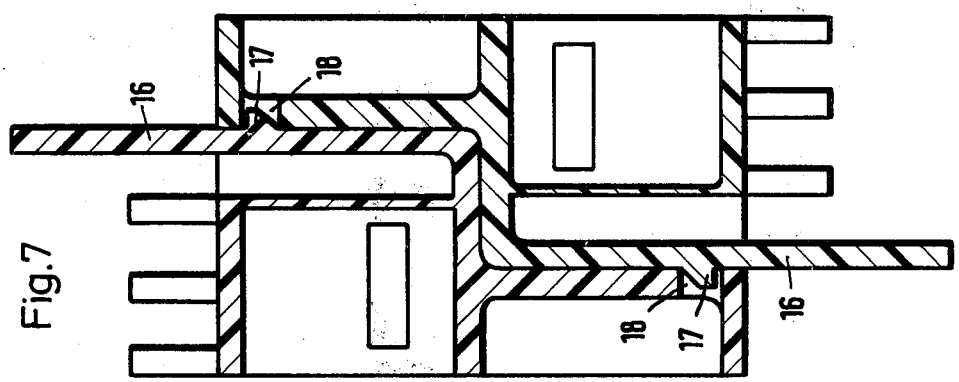
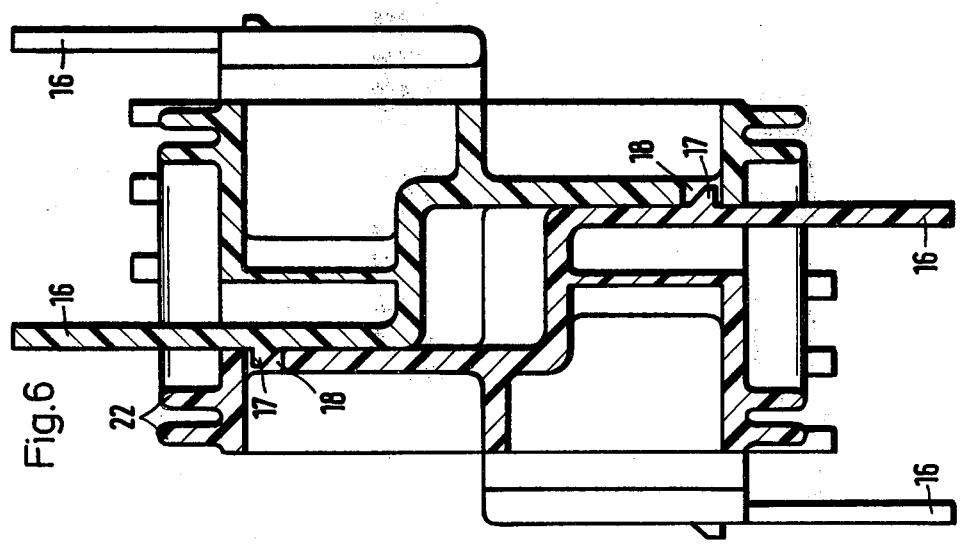

INSULATED MOUNTING FOR LIVE RAILS

BACKGROUND AND STATEMENT OF THE INVENTION

The invention is directed to insulated mountings for live rails whose rail bases are embraced by the mountings. Such insulated mountings are disclosed in German Pat. No. 2,458,029 for individual live rails. Furthermore, German Pat. No. 2,453,754 and German printed application No. 2,424,987 disclose mountings for several adjacent live rails. These latter mountings must differ in size according to the number of live rails, thus necessitating a large stock. Once an installation is made, it can be expanded only with great expenditure when adding more live rails.

It is the object of the invention to provide insulated mountings for live rails in a manner so that they can be expanded to any number of live rails with small cost in material and assembly time. This is achieved by providing them as identical mounting parts, which can be joined together in any number to a package of the desired amount of rails by means of integral projections and recesses. By adding two mounting halves each for each live rail, any number of live rails can be attached subsequently. The mounting halves are completely identical and simplify stocking. Furthermore, it is impossible to obtain wrong sizes for delivery to an assembly site, for example, due to confusion or errors in transfer.

Another feature of the invention is that each mounting half on each side is provided with a support key, or alternatively with a support base which can be inserted into the support key of the next mounting half. The support key has support edges protruding past recesses to engage the support base. The support base consists of an H-shaped profile attached to the support key of a mounting half with a projection and insertable from the front end edge of the adjacent mounting half in its support key. The support base may, however, be part of each mounting half, protruding from the latter as a T-profile. Preferably, each mounting half is provided on one long side with a support key and a support base. On the other side, a further support key with support base is provided, which may be staggered in height versus those on the other side. The support keys start at one end edge and the support bases on the other end edge of the mounting halves, and each one extends to the center of the mounting halves.

The support key and support base are arranged parallel with the live rail to be mounted. The T-shaped rail base is guided into keys of two neighboring mounting halves. This guidance facilitates displacement of the live rail versus the mounting, as may occur from heat expansion or during assembly. In order to eliminate unintentional displacement of the mounting halves against one another, each mounting half is provided with flexible extensions. These are in the form of bars extending in opposite directions, and having abutments engaging in notches of the adjacent halves. The bars are flat, and are attached to the support bases and protrude past the mounting halves. The cooperating notches are arranged in the support keys.

Each mounting half is, according to the invention, provided on the side opposite the rail base, with a support abutment for engaging a panel extending through all mounting halves of one common insulated mounting and attached to a supporting structure, such as the wall of a beam. The mounting halves may be comprised of a synthetic elastomer, and are protected from displacement by means of stops screwed to the panel.

An example of the invention is shown on the drawings and explained as follows:

DETAILED DESCRIPTION OF THE DRAWINGS

FIG. 3 is a side elevational view of a mounting half illustrating the invention;

FIG. 4 is an exploded end elevational view of two cooperating mounting halves illustrating the invention;

FIG. 5 is an end elevational view of a bank of live rails supported in three joined pairs of mounting halves of the invention;

FIG. 6 is a cross-sectional view along line VI—VI of FIG. 5; and

FIG. 7 is a cross-sectional view along line VII—VII of FIG. 5.

DETAILED DESCRIPTION OF THE INVENTION

Figure 2:
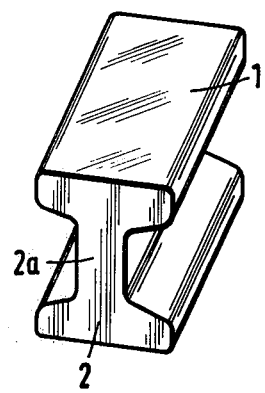
FIG. 2 is a perspective view of a section of live rail to be held by the mounting of the invention.
Figure 1:
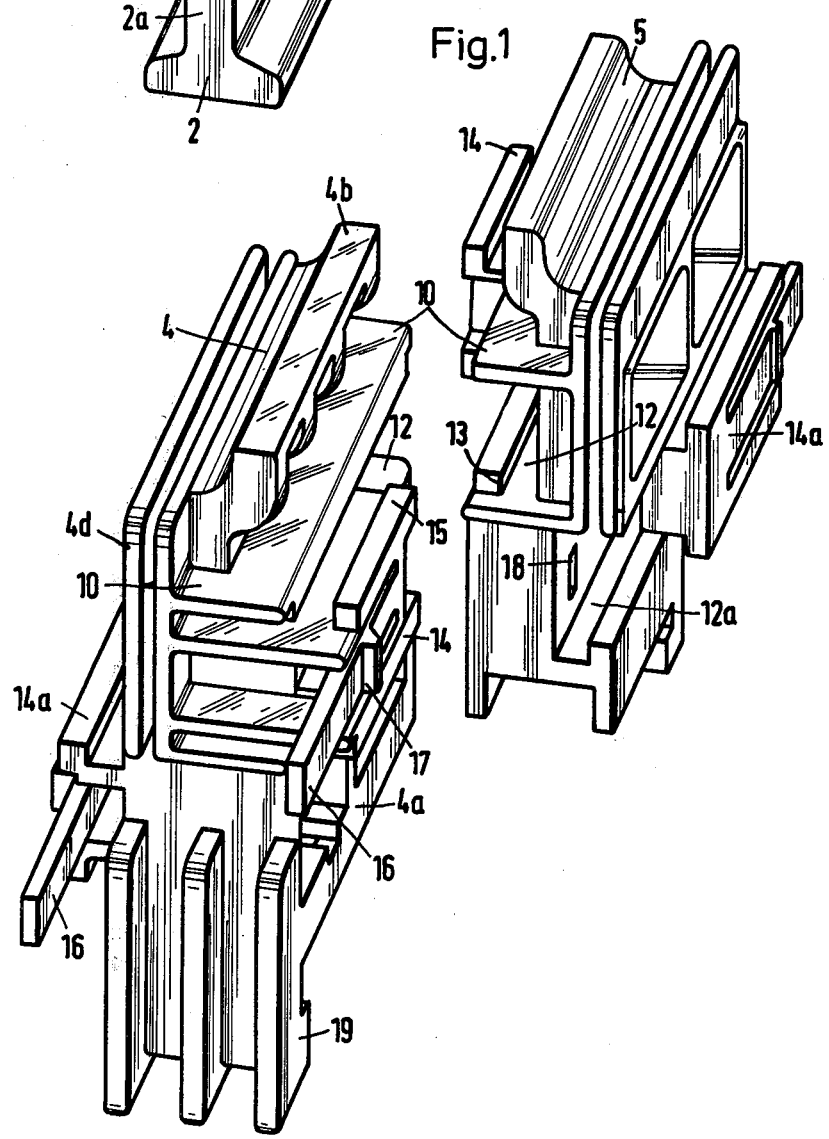
FIG. 1 is a perspective view of a pair of rail mounting halves, illustrating the invention.

The mounting in FIG. 1 consists of two identical mounting halves 4 and 5 essentially shaped like plates. The mounting halves can be connected if they are—as indicated in FIG. 1—moved toward each other. To this end, cooperating projections and grooves engage. Specifically, the mounting halves enclose, a base 2 of live rail 1 to be supported, as shown in FIG. 2, in which the upper portions of mounting halves 4 and 5 extend over each side of base 2.

In order to obtain the desired effect, each half of the mounting is arranged as follows. Key 10 is parallel with the top plane of mounting half 4, which is open toward side face 4a (on the right-hand side in the drawing), and continuous in the longitudinal direction of mounting half 4. The cross section of key 10 matches half the rail base 2 of live rail 1. Above key 10 the lateral face of mounting half 4 recedes in a direction away from side 4a by about half the thickness of web 2a of live rail 1, to provide rail base retainer 4b.

Below key 10 and parallel with same, side face 4a is provided with a T-shaped primary projection 14 with opposed abutments 15 as part of the mounting half, starting at the frontal end facing the observer, and ending at the center of side 4a. Projection 14 is aligned with recess 12 and they extend along the rear side of mounting half 4. The cross section and length of recess 12 correspond to projection 14, and along its entire length recess 12 is bordered by a retainer seat 13. The mounting halves may, from the position shown in FIG. 1, be joined together so that projection 14 of one mounting half engages with recess 12 of the other mounting half.

In order to fit another mounting half (into which, in turn, the next adjacent mounting half following laterally may be inserted) at plane 4b staggered in verticle direction and opposing plane 4a, side face 4d is also provided with secondary projection 14a which is T-shaped in cross section, and which is followed by a secondary recess 12a of identical cross section shape. This recess 12a may be seen on mounting half 5, shown on the the right in FIG. 1. The projection 14a and the recess 12a each extend across half the length of side faces 4d. They are, however, arranged vertically lower than parts 14 and 12 on the opposite side face.

In order to secure the compressed halves against inadvertent release, flexible return safeguards in the shape of bars 16 with projecting safety latches 17 are provided in the side face area, such safety latches 17 catching in notches 18 of recesses 12. Bars 16 serve as handles projecting beyond the ends of the mounting halves, as shown clearly in FIGS. 3, 6 and 7.

Each mounting half is provided, at the frontal plane opposite live rail 1, with a retaining extension 19 for attachment to stabilizer panel 3. Panel 3 is a flat profile extending at right angles to live rails 1 across all mounting halves, according to FIG. 5, and attached to a beam not shown here, along which travels vehicles provided with sliding contacts. The mounting halves are secured against displacement by means of screws 21 and stops 20 in the form of sleeves on panel 3.

In order to enlarge the surface, mounting halves 4 through 9 are provided with fins 22 to increase the dissipation surface. FIG. 5 shows, besides mounting halves 4 through 9, a panel 3, to which mounting halves 4 through 9 are attached via two stops 20. FIGS. 6 and 7 show how the safety latches 17 of the bar-shaped return safeguards catch in notches 18 of the respective adjacent mounting halves.

I claim:

1. Insulated mountings for live rails, characterized by
   (a) at least one pair of cooperating identical mounting halves;
   (b) each mounting half having a plurality of cooperating primary projections and recesses;
   (c) the primary recesses of one half cooperating with the primary projections of the other half to engage a rail base;
   (d) said plurality of projections on each mounting half including an upwardly and inwardly extending rail base retainer for extending over one half of a rail base; and
   (e) each said mounting half having a plurality of identical secondary projections and secondary recesses on the side thereof opposite said primary projections and recesses for engaging additional mounting halves.

2. The apparatus of claim 1, further characterized by
   (a) each said primary and secondary projections is a T-shaped structure with opposed abutments extending along the outer edge thereof; and
   (b) each said primary and secondary recess is configured to receive said projections in cooperating engagement.

3. The apparatus of claim 2, further characterized by
   (a) each said projection is insertable end-wise into its respective cooperating recess.

4. The apparatus of claim 3, further characterized by
   (a) each said projection is integral with its respective mounting half.

5. The apparatus of claim 4, further characterized by
   (a) said primary and secondary recesses on one side of each mounting half extending longitudinally from one end edge to the center thereof; and
   (b) said primary and secondary projections on one side of each mounting half extending longitudinally from the end opposite the respective recesses to the center of said mounting half.

6. The apparatus of claim 5, further characterized by
   (a) said primary and secondary projections and recesses extending parallel to the longitudinal axis of their respective mounting halves; and
   (b) the said longitudinal axis of each mounting half, when positioned on a rail to be supported, being parallel to said rail.

7. The apparatus of claim 1, further characterized by
   (a) said primary projections and recesses on one side of each mounting half being displaced vertically from the secondary projections and recesses on the opposite side of each mounting half.

8. The apparatus of claim 1, further characterized by
   (a) each said mounting half is comprised of a synthetic elastomer.

9. Insulated mountings for live rails, characterized by
   (a) at least one pair of cooperating identical mounting halves;
   (b) each mounting half having a plurality of cooperating primary projections and recesses;
   (c) the primary recesses of one half cooperating with the primary projections of the other half to engage a rail base;
   (d) said plurality of projections on each mounting half including an upwardly and inwardly extending rail base retainer for extending over one half of a rail base;
   (e) each said mounting half having a plurality of identical secondary projections and secondary recesses on the side thereof opposite said primary projections and recesses for engaging additional mounting halves; and
   (f) each mounting half having at least one flexible abutment extending from one end edge.

10. The apparatus of claim 9, further characterized by
    (a) each said flexible abutment is in the form of a bar;
    (b) each said mounting half includes two flexible abutments extending from one end edge thereof; and
    (c) said two flexible abutments at one end of each mounting half being displaced vertically from each other.

11. The apparatus of claim 10, further charcterized by
    (a) each said flexible abutment extends from the end edge of one of said primary and secondary projections;
    (b) each said flexible abutment includes an integral locking extension; and
    (c) each said cooperating recess includes a cooperating notch for receiving one of said locking extensions in cooperating engagement.

12. Insulated mountings for live rails, characterized by
    (a) at least one pair of cooperating identical mounting halves;
    (b) each mounting half having a plurality of cooperating primary projections and recesses;
    (c) the primary recesses of one half cooperating with the primary projections of the other half to engage a rail base;
    (d) said plurality of projections on each mounting half including an upwardly and inwardly extending rail base retainer for extending over one half of a rail base;
    (e) each said mounting half having a plurality of identical secondary projections and secondary recesses on the side thereof opposite said primary projections and recesses for engaging additional mounting halves; and
    (f) each mounting half including a retaining extension at the bottom thereof opposite said rail base retainer;
    (g) a stabilizer panel extending along the bottom of each adjacent mounting half; and
    (h) the said retaining extension of each mounting half engaging said stabilizer panel.

* * * * *